United States Patent Office 3,123,558
Patented Mar. 3, 1964

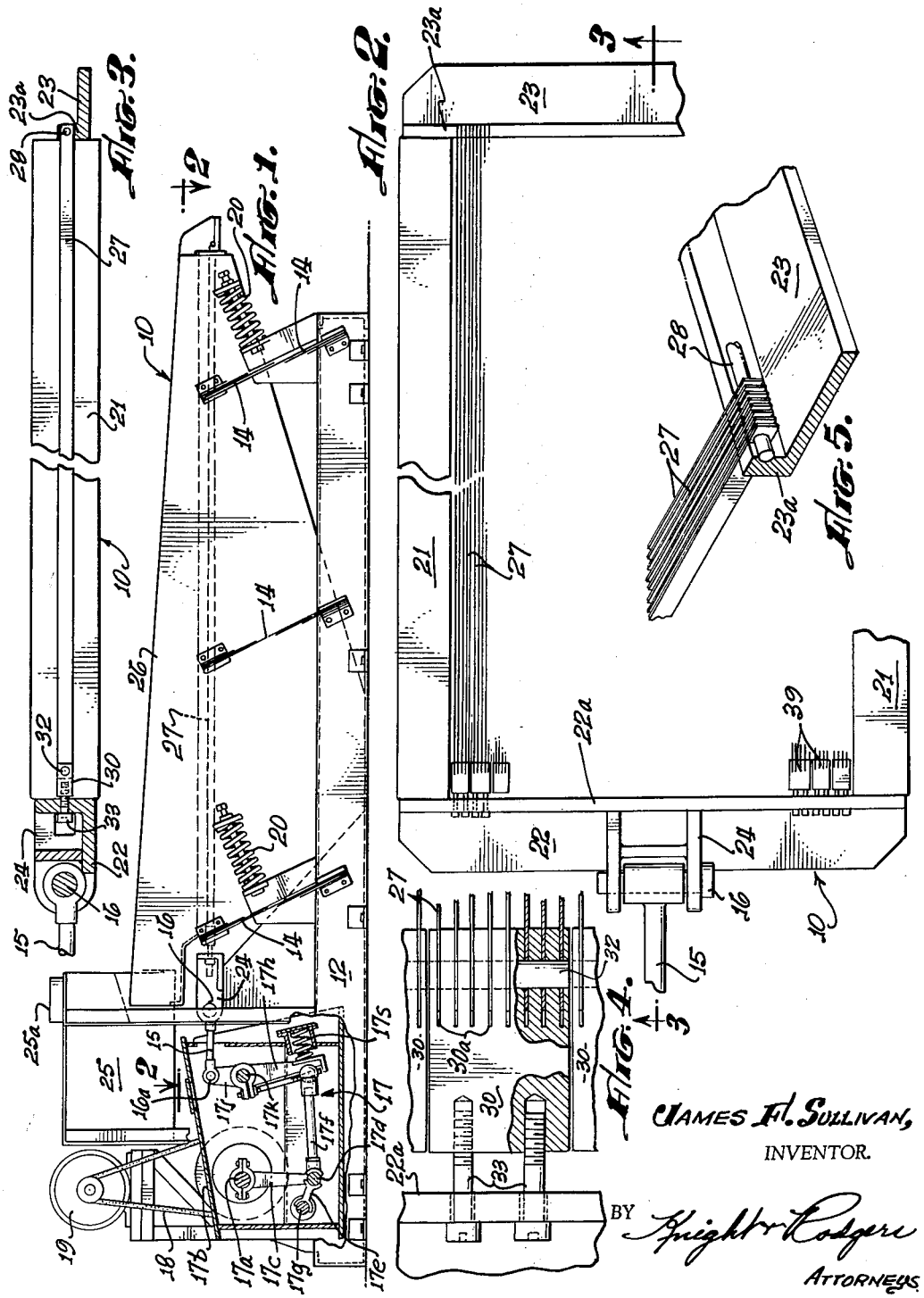

3,123,558
TENSIONED RIBBON SCREEN
James F. Sullivan, Dallas, Tex., assignor to Overstrom & Sons, Inc., Alhambra, Calif., a corporation of California
Filed Apr. 3, 1961, Ser. No. 100,327
1 Claim. (Cl. 210—389)

Present invention relates generally to flat screens, and more particularly to dewatering screens to which a periodic motion is imparted to remove accumulated solids.

Screens of this type find various uses, but a typical use is a screen for dewatering sewage. Here, the feed to the screen is a fluidized mixture of water and solids. The larger solids are to be removed from the mixture and retained on the screen while the water and fine solids pass through. The percentage of solids in the feed may be rather low in a typical installation but a substantial part of the solid materials is relatively large in size so that the retained materials, if allowed to remain on the screen, pack tightly and cover the screen in a short time. If the solids were not continuously removed, the growing accumulation would soon prevent the ready passage of water through the screen, and dewatering action would fail.

In installations of the type with which we are here concerned, the screen is given a periodic non-rotary motion by imparting to it some vibrating, shaking, or gyratory motion. The motion is of such a character that the layer of retained materials is caused to move along the top of the screen from the inlet end to the discharge end thereof, and thence off the screen. Thus solid materials are continually cleaned off the screen and the solids bed moving over the surface of the screen is maintained at constant depth.

In all designs of screens heretofore known to applicant great difficulty has been encountered in keeping the mass of retained solids moving along the flat surface of the screen. These solids may include large agglomerations of grease, fibers from paper and cigarette filters, pieces of cellophane and rubber goods, and other elongated articles of substantial strength which are of such nature that one end can drop down between the screen elements while the article is supported on the screen. When the screen has cross-members in it, as in a wire cloth screen, or any type of grid screen in which spacers, cross ties, or other transverse members or projections are present, retained solids of this type lodge against the transverse members or projections so firmly that they cease to move under normal screen movement. These elongated articles catch upon transverse members of the screen and can attach themselves to these transverse members with considerable firmness; and by so doing they hold other smaller solid particles that build up a body attached to the screen and through which water cannot pass.

The character of these elongated materials retained on top of the screen is also such that they often become attached to the longitudinal elements of the screen if such longitudinal elements are comparatively shallow. For example the longitudinally extending wires of a grid screen normally have a small enough vertical dimension that the elongated materials of the type referred to above can hang down on both sides of the longitudinally extending wires and become entwined under the wires. Thus the elongated solid particles become wrapped around the screen wires in such a way that the particles become firmly attached to the screen. A few such pieces then form barriers against which other solid particles lodge, hindering their movement along the screen. In this case a mass of solids eventually builds up and becomes so firmly attached to the screen that it ceases to progress along the screen, even when the screen is moving. Eventually it must be dislodged by hand or by mechanical cleaning means.

Thus it becomes the general object of my invention to provide a dewatering screen which is free of any obstructions to the longitudinal movement of retained materials over the screen.

More particularly, it is an object of my invention to provide a screen of the character described in which there are no transversely extending projections or screen members upon which the retained solids can catch and thus impede or prevent movement of the solids longitudinally of the screen.

It is a further object of my invention to provide a dewatering screen composed of longitudinally extending members which are of uniform width, have smooth surfaces free of lateral projections, and which are of sufficient vertical dimension or depth to minimize or eliminate the tendency of elongated materials retained on the screen to wrap around the longitudinally extending screen elements and thus become attached to the screen.

It is also an object of the invention to provide a grid type screen having closely spaced longitudinally extending members thus enabling the removal of a high percent of the total solids entering in the fluidized feed to the screen.

A further object of the invention is to provide a dewatering screen which has a maximum possible percentage of open area, that is, one in which the ratio of the open area between screen elements to the area of the screen elements themselves is as high as possible.

These and other objects of my invention are attained in the dewatering screen constructed according to my invention by providing a frame which is typically of generally rectangular outline having at two opposite sides parallel compression members and at the two opposite ends transverse members. A plurality of thin, flat ribbons are attached at their ends to the frame. The ribbons are placed on edge, that is with their edges up and the flat faces in vertical planes, and are arranged to extend parallel to each other and to the compression members to provide a plurality of thin, closely spaced screen elements upon which are retained solids carried in the feed to the screen. These ribbons have smooth surfaces which are free of any transverse members or lateral projections upon which the retained solids can lodge and also have sufficient depth or vertical dimension to prevent the retained solids from looping or wrapping around and catching underneath the ribbons and thus becoming attached to the screen. The ribbons are attached only at their ends to the screen frame and are unsupported between the two points of attachment. In a preferred embodiment of the screen illustrated, a vibratory or shaking motion is imparted to the screen for the purpose of advancing the material across the top surface of the screen to a discharge point at one end thereof; but any suitable type of periodic motion may be used for this purpose.

In order to attach the ribbons to the frame members, means are provided at one end of the ribbons for effecting a rigid pin connection between the ribbons and the frame. At the other end the ribbons are connected to a plurality of blocks which in turn are connected to the frame. Each of these blocks is connected, preferably by a means of a pin, to a plurality of ribbons, there being a plurality of such blocks arranged in a row across the frame. Each block is movable with respect to the frame and is positioned by adjusting screw means by which all of the ribbons attached to one block can be simultaneously placed under tension sufficient to maintain the entire cross section of each of the ribbons under a net tension stress even when loaded with the retained solids on the upper surface of the screen. The ribbons are flexible members, closely spaced from each other but they are maintained in their parallel, spaced positions by the tension applied to each of the ribbons.

How the above objects and advantages of my invention are attained, as well as others not specifically mentioned herein, will be more readily understood by reference to the following description and to the annexed drawing in which:

FIG. 1 is a side elevation of a dewatering screen constructed according to my invention.

FIG. 2 is a fragmentary plan view of the screen alone.

FIG. 3 is a vertical longitudinal section on line 3—3 of FIG. 2.

FIG. 4 is an enlarged fragmentary plan view illustrating the ribbon connecting and tensioning means.

FIG. 5 is an enlarged fragmentary perspective showing the manner of attaching the ribbons at one end thereof to the frame.

Referring now to the drawing, there is shown a presently preferred embodiment of my invention in which the screen indicated generally at 10 is yieldingly supported on a stationary base 12 by means of a plurality of flexible spring supports 14. Each of these spring supports is a plurality of leaf springs attached at one end to screen 10 and at the other end to base 12 which provides a fixed support for the lower end of the springs, the springs preferably being inclined to the vertical. The construction and operation of these spring supports are discussed at length in Patent 2,062,760, issued December 1, 1936, to G. A. Overstrom.

A suitable motion is imparted to the screen by connecting rod 15 which is connected at one end to the screen by pin 16 as is shown in FIG. 2 and at the other end by pin 16a to driving means. Connecting rod 15 is driven by a linkage indicated generally at 17 and which in turn is driven by belt 18 from motor 19. Linkage 17 includes crankshaft 17a to which is attached flywheel 17b around which passes belt 18. Connecting rod 17c is attached at one end to a crank on crankshaft 17a and at the other end carries pin 17d. Open end bearings on the ends of short toggle arm 17e and long toggle arm 17f bear on pin 17d at opposite sides thereof. The other end of short arm 17e has an open end bearing and bears against fixed pivot pin 17g. The other end of the long toggle arm 17f has an open socket that bears against a ball on rocker arm 17h. Rocker arm 17h oscillates about a fixed pivot at 17k. The upwardly extending portion 17j of rocker arm 17k is pin-connected at 16a to the end of connecting rod 15 to transmit motion to the screen. Spring 17s bears against a fixed abutment and against the lower end of rocker arm 17k to keep the several open end bearings seated in position against the opposing members. The construction and advantages of this particular drive mechanism are set forth in detail in Patent 2,157,562 and Patent 2,366,980, issued, respectively, May 9, 1939 and January 9, 1945, to G. A. Overstrom, to which reference may be made for further details. As is explained in the patents, it is desired to spring load the drive mechanism and that is accomplished by helical springs 20 extending between the screen frame and fixed abutments on base 12, in addition to spring 17s.

It is inherent in the type of drive mechanism herein shown and described that it imparts to the frame a differential motion, that is, a reciprocating or vibrating motion in which the movement in one direction during one portion of the cycle is more prolonged in distance than the movement in the reverse direction during each cycle, although enduring for the same length of time. This movement is explained in detail in the earlier Patent No. 2,157,562 in which it is pointed out that the screen box moves a greater distance during the last half of its forward stroke and the first half of its return stroke than during the beginning portion of the forward stroke and the terminal portion of the return stroke. This is also a characteristic of other mechanical movements, such as those of the "quick-return" type. It is also inherent in this type of drive mechanism that the screen frame is vibrated at a relatively low speed, i.e., under 1,000 cycles per minute, a typical speed being in the range of 400–600 cycles per minute.

Generally speaking, the present invention is concerned with the construction of the screen itself and any suitable means desired for supporting the screen and imparting the desired type of a motion to it may be used in place of those illustrated because they are particularly adapted to a screen for dewatering sewage sludge.

The screen itself is shown in greater detail in FIGS. 2, 3, 4 and 5. The screen comprises a screen box or frame on which the ribbons are mounted. The invention is not limited to a particular size or shape of the frame, but for obvious reasons, it is preferred to employ a rectangular frame having at two opposite sides parallel compression members 21 and at opposite ends the transverse members 22 and 23 designed to resist bending. The side members 21 are hollow members designed to resist the axially applied loads which place these members in compression, as will be better understood as the description progresses. The two end members 22 and 23 are angular in shape since they are designed to resist transverse loads which cause these members to act like beams supported at their ends. Pull bracket 24 is attached to transverse frame member 22 and pin 16 in bracket 24 is connected to drive rod 15.

The feed to the screen is a fluidized mixture of water and solids introduced into feed box 25 through inlet 25a. The feed box discharges the feed uniformly across the screen at the feed or inlet end of screen 10. The screen has side boards 26 which rise above the screening elements 27 to prevent lateral discharge of the water or solids.

The screen frame thus formed by the members 21, 22 and 23 provides a support for a plurality of thin, closely spaced screening elements in the form of flat ribbons 27. These ribbons 27 are bands of high tensile strength steel or other material which are placed edgewise on the frame, that is with their narrow edges up and with their flat sides facing each other. While the invention is not limited to a particular size or shape of these bands, they may typically be about one thirty-second inch in thickness and one-half to three-fourths of an inch in width. These bands all have flat, smooth side faces, and smooth rolled edges free from any lateral projections; and the bands are uniformly spaced apart throughout their entire length.

In general, it is desirable that the ribbons be as close to one another as possible, consistent with the size of the particles which it is desired to retain on the screens. It is possible with the method of mounting the ribbons constituting features of this invention to mount the successive ribbons at small intervals which are typically about one-sixteenth to one-eighth inch; but the spacing may be more or less as desired.

The means for connecting ribbons 27 to the screen frame at the discharge end of the screen, which is the right hand end as viewed in the figures, is shown in detail in FIG. 5. There it will be seen that the upstanding leg 23a of the angular transverse member 23 is shorter than the horizontal leg. This upstanding leg 23a has a plurality of transverse slots each of a width to receive snugly one of the ribbons 27. The portions of leg 23a between successive slots thus act as spacers between the ribbons. Each of the ribbons 27 is provided near one end with a hole; and rod 28 is passed through all of these holes in the ribbons when they are seated in the slots in transverse member 23a. The upstanding leg of the transverse member is preferably provided with a half round groove which is a seat to receive rod 28 in order to hold it against vertical movement and to increase the bearing area between the transverse member and rod 28. Rod 28 thus provides a fixed pin connection at one end of all of the ribbons between the ribbons and the screen frame.

At the other end of the frame, which is the feed or inlet end, the means for connecting the ribbons to the frame is shown in detail in FIG. 4. This arrangement includes a plurality of blocks 30 which are arranged in a row that extends transversely across the frame. Each block 30 has at one end a plurality of slots 30a, here shown as eight in number, each slot of a width to receive one of the ribbons 27. Pin 32 is then passed through a transverse bore in the block and aligned holes in all the ribbons of the group, to connect this group of ribbons to the block.

The upstanding leg 22a of the transverse frame member 22 is provided at regular intervals with bores through which pass adjusting screws 33. Two such screws are screw threaded into the end of each block 30 which is opposite to the ribbons 27. Screws 33 serve to position each block 30 individually with respect to transverse member 22 of the screen frame. At the same time, as the screws are tightened up, a tension load is placed on all of the ribbons connected to that block. Because of the close spacing of ribbons 27 it is impractical to provide individual tensioning means for each of the ribbons unless the tensioning means are staggered or offset as is the case with tensioning means in musical instruments. It is also impractical, because of the loads involved and the unequal stresses produced, to tension all ribbons at the same time. However, by tensioning the ribbons in groups, as shown in FIG. 4, it is possible to maintain the ribbons closely spaced together and at the same time to provide the sufficient degree of individual adjustment to obtain the necessary equality of tension in the ribbons. Each group represents a plurality of ribbons which is a small fraction of the total number of the screen. For example a screen with 176 ribbons has been provided with 22 blocks each attached to and tensioning eight ribbons. Since each pin 32 is substantially the width of the block 30, the blocks require no spacing between them and uniform spacing of ribbons across the entire width of the screen can be maintained.

Many design and production advantages are achieved, such as uniform size and interchangeability of parts, minimizing of production steps and tools, simplicity of design, and reliability. It will be appreciated that the ribbons all must be under a certain minimum tension, and that a substantial degree of uniformity of stress is desired. The design described achieves this result with a minimum of parts.

The required amount of longitudinal pull on each of the ribbons varies with several factors, including the vertical loading imposed by the solids retained on top of the screen, the unsupported length of the ribbons, the cross-sectional area, and others. Assuming a typical screen in which the ribbons are one-half inch deep and one thirty-second inch thick, it has been found that a pull equal to a minimum of 100 pounds per ribbon is indicated when the unsupported length is approximately eight feet. However, in practice it has been found preferable to increase this to a minimum of around 200 to 250 pounds per ribbon.

By applying adequate tension pre-loading to each of the individual ribbons, they are stabilized in position and several important advantages are achieved. In the first place the ribbon members being fixed at their ends and under tension, they remain straight and also remain parallel to each other across the entire width of the screen. The tension loading of the ribbons stabilizes them in position and prevents them from twisting or turning under normal loads as well as prevents them from vibrating excessively under the motion of the screen itself. Consequently uniform spacing between the individual ribbons is maintained without the necessity of any lateral projection or transversely extending members which either support the ribbons from below or pass through them for the purpose of providing additional support or spacing of the ribbons intermediate their ends.

The action of the tension pre-load in maintaining stability of the thin ribbons over a relatively long unsupported span can be understood best by considering the individual ribbon as a beam supported at its ends under a uniform vertical load. The total load consists of the dead weight of the section, the vertical component of the inertia force on the band due to the vibratory motion of the screen; and the weight of material retained on the top of the screen.

If the ribbons were merely pin connected at their ends and unstressed, the vertical loading would create a compressive stress in the outermost fiber at the upper edge which would be in excess of the ability of the ribbon to resist buckling. The top edge of the ribbon would, as a consequence, deflect to one side or the other because of this compressive stress which reduces the stiffness of the band and its ability to maintain its position in a vertical plane. The ribbon would tend to sag, just as a wire would; but the sag would be more pronounced than in the case of a wire, because of its greater flexibility in comparison with a wire of circular cross-section. This is so because the moment of inertia of the ribbon about the neutral axis parallel to the longer dimension of the cross-section is less than the moment of inertia of a round wire about its diameter for an equal cross-sectional area.

The minimum amount of tension force required to maintain stability of the ribbons can be calculated from known or assumed conditions and the cross-section of the ribbon. In the example already assumed, the ribbons are one thirty-second of an inch thick and one-half inch deep with an unsupported length of eight feet. It is assumed that the screen is being oscillated in simple harmonic motion and in a straight line inclined at thirty degrees to the horizontal with an amplitude of one-half inch at a speed of approximately 600 cycles per minute. It is assumed further that the average loading due to the retained material on the top of the screen and transported over the surface is .015 pounds per foot per band. Based on these conditions it can be calculated that the loading due to the dead load (weight) of each band is .055 pound per foot and the vertical component of the inertia load is .014 pound per foot per ribbon. Thus the total loading is .015 pound+.055 pound+.014 pound=.084 pound per foot for each ribbon.

Analyzing the loads in each ribbon having the assumed dimensions according to well known formulas for beam design, it is found that the maximum stress at the top and bottom of each ribbon produced by this loading is 6000 p.s.i. Consequently, addition of a tension force which will stress the strip to 6000 p.s.i. when otherwise unloaded, will exactly cancel the compressive stress in the top edge of the band while doubling the tensile stress at the bottom edge to 12,000 p.s.i. For the dimensions assumed, the force required to produce this cancelling stress is approximately 100 pounds per band.

As a matter of practice the tension applied to each band should be substantially in excess of the minimum force required to neutralize compressive stresses resulting from normal loads. The ribbons are stabilized in position even under temporary over-loads if the tension applied to each band is in excess of that sufficient to insure the entire cross-sectional area of each ribbon is continuously under tension during the application of all ordinary operating loads. From a practical standpoint this means that the minimum pull applied to each ribbon should be about 200 to 250 pounds per ribbon giving a maximum tension of about 12,000–18,000 p.s.i. This has been found in actual experience to be adequate.

From the foregoing description it will be apparent that various changes may be made by persons skilled in the art without departing from the spirit and scope of my invention. Consequently, it is to be understood that the above description is considered to be illustrative of, rather than limitative upon the invention as defined in the appended claim.

I claim:

In a dewatering screen, the combination of: a frame of generally rectangular outline and having at opposite sides parallel compression members; a plurality of thin, flat ribbons placed on edge and extending parallel to each other and to said compression members to provide a plurality of thin, closely spaced screen elements on which solids are retained, said ribbons having smooth surfaces free of lateral projections able to impede movement of retained solids lengthwise of the ribbons; means effecting a pin connection between the frame and all the ribbons at one end of the ribbons; means at the other end of the ribbons for connecting the ribbons to the frame including a plurality of blocks side by side in a transverse row across the plurality of ribbons, pin means in each block connecting to each block a plurality of ribbons, a plurality of screws adjustably connecting each block to the frame in order to independently adjust each block relative to the frame and to tension simultaneously and substantially equally all the ribbons connected to a given block, the tension in each ribbon being sufficient to maintain the entire cross-section of each ribbon under tension under a normal vertical load of retained solids and the inertia forces imposed by their motion in a vertical plane, and drive means connected to the frame imparting to the frame and ribbons thereon a vibratory motion of low frequency and high magnitude having a component in a vertical plane normal to the length of the ribbons.

References Cited in the file of this patent

UNITED STATES PATENTS

| | | |
|---|---|---|
| 2,261,771 | Laubenstein | Nov. 4, 1941 |
| 2,585,719 | Alvord | Feb. 12, 1952 |
| 2,839,197 | Nordell | June 17, 1958 |
| 2,907,404 | Mare | Oct. 6, 1959 |

FOREIGN PATENTS

| | | |
|---|---|---|
| 784,995 | Great Britain | Oct. 3, 1957 |